Jan. 3, 1967 J. P. STAPLES 3,296,551
SOLID STATE MODULATOR CIRCUIT FOR SELECTIVELY PROVIDING DIFFERENT PULSE WIDTHS
Filed Aug. 9, 1965
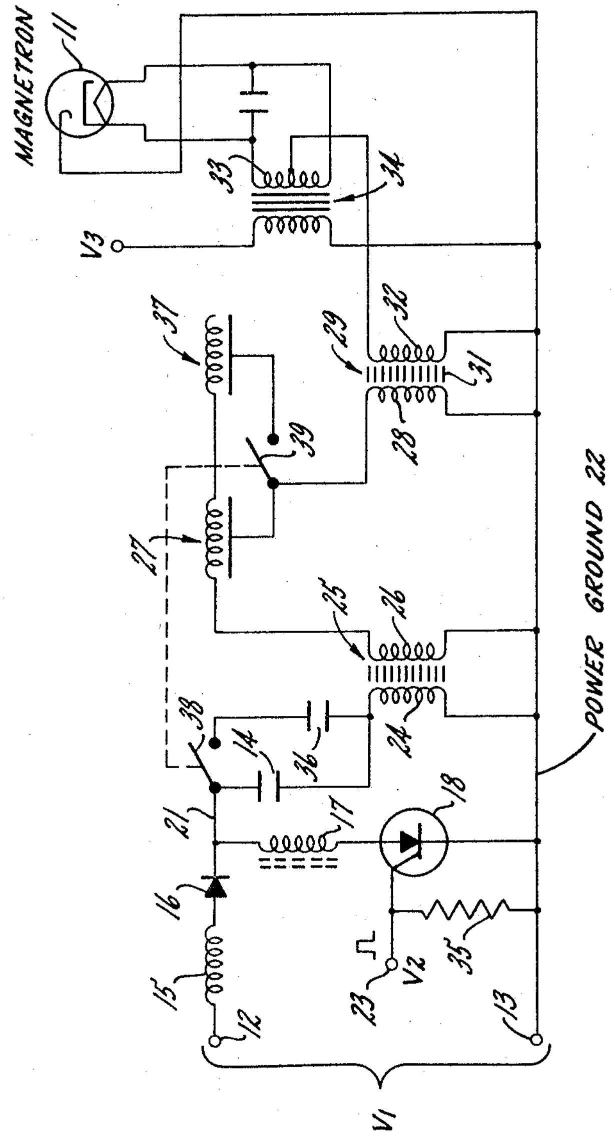
INVENTOR.
John P. Staples,
BY
H. H. Losche
Paul S. Collignon Att'ys.

United States Patent Office 3,296,551
Patented Jan. 3, 1967

3,296,551
SOLID STATE MODULATOR CIRCUIT FOR SELECTIVELY PROVIDING DIFFERENT PULSE WIDTHS

John P. Staples, Indianapolis, Ind., assignor to the United States of America as represented by the Secretary of the Navy Filed Aug. 9, 1965, Ser. No. 478,490
1 Claim. (Cl. 331—87)

The invention described herein may be manufactured and used by or for the Government of the United States of America for governmental purposes without the payment of any royalties thereon or therefor.

The present invention relates to a switching circuit and more particularly to a switching circuit for use in a radar modulator.

A radar modulator provides short duration, high voltage, high current pulses to a magnetron which generates microwaves for the radar system. One essential function of a modulator is the intermittently switching of a high voltage, high current source across a load.

In one type of modulator, a switch, charging inductor, and pulse forming network are provided, with the pulse forming network being charged from a voltage source. During the charging period of the pulse forming network, the switch is open and the network acts simply as a capacitor. When the network is fully charged and the charging current has fallen to zero, the switch is closed and the pulse forming network discharges through a pulse transformer into a magnetron load. The switch is then opened and the cycle is repeated. The switch must carry a large peak current during the discharge of the network and might be a spark-gap, a thyratron, or a thyractor.

A thyratron has a disadvantage in that it requires heater power, is relatively short lived, and generates noise interference. A thyractor has a disadvantage in that the pulse forming network must discharge through the saturated reactance of the thyractor and, as this reactance becomes part of the pulse forming network, the shortness of the pulse obtainable is limited.

In the present invention, a capacitor is resonantly charged through an inductor and a silicon controlled rectifier and, when the capacitor is charged, the silicon controlled rectifier ceases to conduct and acts as a hold-off diode, thereby keeping the charge on the capacitor. A second silicon controlled rectifier is provided and, when triggered on, the capacitor begins to conduct through a second inductor and the second silicon controlled rectifier. The core of the second inductor then saturates and the capacitor resonantly discharges through the second inductor and the primary winding of a first transformer. The voltage induced on the secondary winding of this transformer charges a pulse forming network through the primary winding of a pulse transformer. The core of the first transformer when saturates causing the pulse forming network to discharge through the remaining inductance of the secondary winding of the first transformer and the primary of the pulse transformer. This causes a very large voltage to be induced upon the secondary of the pulse transformer, which voltage is used to operate a magnetron, and then the cycle is repeated.

The simplicity of the circuit of the present invention permits a second pulse forming network to be switchably connected into the circuit by switching a second capacitor in parallel with the first capacitor, and by merely switchably connecting the second pulse forming network between the secondary winding of the first transformer and the primary winding of the pulse transformer.

It is therefore a general object of the present invention to provide an improved solid state modulator for operating a magnetron.

Another object of the present invention is to provide a modulator switch that will have long life and which will operate without maintenance.

Other objects and advantages of the present invention will be readily appreciated as the same becomes better understood by reference to the following detailed description when considered in connection with the accompanying drawing which is a schematic circuit diagram showing a preferred embodiment of the present invention.

Referring now to the drawing, there is shown a solid state modulator circuit for operating a magnetron 11. A direct current voltage source, V1, is applied at terminals 12 and 13 and this voltage source is used to resonantly charge capacitor 14 through inductor 15 and diode 16. Charging choke 15 is chosen to series resonate with capacitor 14 and this technique is known as D.C. resonant charging. By way of example, the core of choke 15 might be a tapewound, hypersil "C" type with sufficient air gap to compensate for the large D.C. current through it. A second inductor 17 is connected in series with a silicon controlled rectifier 18 across input leads 21 and 22. A second voltage source V2 is applied at terminal 23 to provide pulses that periodically trigger SCR 18. When capacitor 14 is fully charged, SCR 18 is triggered and capacitor 14 is discharged through inductor 17 and the primary winding 24 of a transformer 25. As shown in the drawing, primary winding 24 has one end connected to power ground 22 and the other end connected to one end of capacitor 14.

Upon discharge of capacitor 14 through inductor 17 and primary winding 24, a voltage is induced on the secondary winding 26 of transformer 25 and this induced voltage charges pulse forming network 27 through the primary winding 28 of a pulse transformer 29. Pulse forming network 27 is charged to a high voltage in a very short period of time and the core 31 of pulse transformer 29 saturates causing pulse forming network 27 to discharge through the remaining inductance of the secondary winding 26 of transformer 25 and the primary winding 28 of pulse transformer 29. This causes a high voltage to be induced upon the secondary winding 32 of pulse transformer 29 which is used to operate the magnetron 11. As shown in the drawing, primary winding 28 of pulse transformer 29 has one end connected to power ground 22 and the other end is connected to pulse forming network 27. The secondary winding 32 of pulse transformer 29 has one end connected to power ground 22 and the other end is connected to the center tap of secondary winding 33 of transformer 34.

By way of example, the circuit shown in the drawing may be built and operated with the following components and values:

Voltage V1—270 v. D.C.
Voltage V2—10 v. pulse
Voltage V3—115 v.=400 cycle
Inductor 15—16 mh.
Inductor 17—2.5 μh.
Resistor 35—100 ohms
Capacitor 14—.33 μf.
Capacitor 36—.67 μf.
Winding 24—6 turns #20 wire
Winding 26—56 turns #20 wire
Winding 28—12 turns #16 wire
Winding 32—78 turns #28 wire
PFN 27—.25 μsec.=35 ohms
PFN 37—.75 μsec.=35 ohms
Diode 16—2N2619
SCR 18—37RE100

In operation, capacitor 14 is series resonantly charged through inductor 15 to a voltage three or four times the value of V1. When capacitor 14 is fully charged, diode 16 stops conducting and acts as a hold-off diode thereby keeping the charge on capacitor 14. The time to charge capacitor 14 is approximately 300 microseconds. When silicon controlled rectifier 18 is triggered on by V2, capacitor 14 begins to conduct through inductor 17 thereby saturating the core of inductor 17. The time required to saturate the core of inductor 17 allows silicon controlled rectifier 18 to begin conducting and capacitor 14 series resonantly discharges through inductor 17 and the primary winding 24 of transformer 25. The voltage induced on the secondary winding 26 of transformer 25 charges the pulse forming network 27 through the primary winding 28 of pulse transformer 29. Pulse forming network 27 is charged to approximately 4,000 volts in about five microseconds. The core of transformer 25 saturates causing the pulse forming network 27 to discharge through the remaining inductance of the secondary winding 26 of transformer 25 and the primary winding 28 of transformer 29. This causes a voltage of approximately 15,000 volts to be induced upon the secondary of transformer 29 which is used to operate magnetron 11. The cycle is then repeated and the charging of capacitor 14 resets the core of transformer 25.

As shown in the drawings, a second capacitor 36, a second pulse forming network 37, and a pair of switches 38 and 39 are provided. Switches 38 and 39 are arranged to open and close simultaneously. When switches 38 and 39 are open, capacitor 14 and pulse forming network 27 are connected in the circuit and this combination provides a pulse width to the magnetron of one-fourth microsecond. By closing switches 38 and 39, capacitor 36 and pulse forming network 37 are additionally added to the circuit and a pulse width of one microsecond is supplied to the magnetron.

It can thus be seen that the present invention provides an improved switching circuit for use in a radar modulator. It should be understood that the above-listed values and components are for purposes of illustration only and that other values and components might readily be employed by those skilled in the art. The foregoing disclosure relates to only a preferred embodiment of the invention and numerous modifications or alterations may be made therein without departing from the spirit and scope of the invention as set forth in the appended claim.

What is claimed is:

A solid state modulator circuit for selectively providing different pulse widths for a radar magnetron comprising:

a first source of direct current voltage, a first inductor, a first capacitor, and the primary winding of a first saturable transformer connected in series across said voltage source, a second inductor and a silicon controlled rectifier connected in series between the junction of said first inductor and said capacitor and one side of said voltage source, a second saturable transformer having primary and secondary windings, a first pulse forming network having one end connected to one end of the secondary winding of said first saturable transformer and the other end to one end of the primary winding of said second saturable transformer, the other ends of said secondary winding of said first saturable transformer and the primary winding of said second saturable transformer being connected to one side of said voltage source, a second capacitor, a second pulse forming network, switching means for simultaneously connecting said second capacitor in parallel with said first capacitor and connecting said second pulse forming network in series with said first pulse forming network, a magnetron connected to said secondary winding of said second saturable transformer, and a source of voltage for pulsing said silicon controlled rectifier.

References Cited by the Examiner

UNITED STATES PATENTS

| | | | |
|---|---|---|---|
| 2,919,414 | 12/1959 | Neitzert | 331—87 |
| 2,946,958 | 7/1960 | Bonia et al. | 328—65 |
| 3,181,071 | 4/1965 | Smith et al. | 328—65 |

FOREIGN PATENTS

| | | |
|---|---|---|
| 163,558 | 6/1958 | Sweden. |

OTHER REFERENCES

Stahl et al., IBM Tech. Disc. Bul., "Core Driver," vol. 2, No. 1.

ROY LAKE, *Primary Examiner.*

J. KOMINSKI, *Assistant Examiner.*